United States Patent [19]
Kaplan

[11] Patent Number: 5,804,818
[45] Date of Patent: *Sep. 8, 1998

[54] COATED INTERNALLY REFLECTING OPTICAL ELEMENT

[75] Inventor: Martin Charles Kaplan, Rochester, N.Y.

[73] Assignee: Eastman Kodak Company, Rochester, N.Y.

[ * ] Notice: The term of this patent shall not extend beyond the expiration date of Pat. No. 5,672,864.

[21] Appl. No.: 593,997

[22] Filed: Jan. 30, 1996

[51] Int. Cl.$^6$ ...................................................... H01J 3/14
[52] U.S. Cl. ................. 250/227.28; 250/227.31; 250/234
[58] Field of Search ............ 250/227.28, 227.29, 250/227.31, 227.32, 228, 234, 235, 236

[56] References Cited

U.S. PATENT DOCUMENTS

| | | | |
|---|---|---|---|
| 4,835,057 | 5/1989 | Bagley et al. ............................ | 428/391 |
| 5,241,459 | 8/1993 | Kaplan et al. ........................... | 362/298 |
| 5,257,340 | 10/1993 | Kaplan ..................................... | 385/128 |
| 5,274,228 | 12/1993 | Kaplan ..................................... | 250/227 |
| 5,672,864 | 9/1997 | Kaplan ................................. | 250/227.31 |

*Primary Examiner*—Edward P. Westin
*Assistant Examiner*—Kevin Pyo
*Attorney, Agent, or Firm*—Gordon M. Stewart

[57] ABSTRACT

An optical element having a light carrying medium through which light can propagate by total internal reflection. The light carrying medium has at least one surface. A layer is positioned adjacent the surface and is of a porous first material of sufficient porosity and with pores which are vacant or contain a second material having an index of refraction lower than that of the light carrying medium, such that the layer reduces total internal reflection in the light carrying medium less than would be reduced using a non-porous layer of the same dimensions of only the first material. A light integrator and scanner using such integrator are also provided.

30 Claims, 3 Drawing Sheets

COATED INTERNALLY REFLECTING OPTICAL ELEMENT

FIELD OF THE INVENTION

The invention relates to a coated internally reflecting optical element, such as a light integrator useful for a light source or light collector, and which is of relatively simple construction.

BACKGROUND OF THE INVENTION

For many applications, it is desirable to have a uniform light beam of some particular shape, or it may be desirable to have a light collector which collects light from a beam of some particular shape. For example, in film digitizers, linear light sources and collectors have been employed frequently. A telecine film scanner typically includes a linear CCD image sensor which provides a serial output of signals representing successive pixels of an image illuminated by a linear light source. For color applications, the film scanner can include an assembly of three separate CCD image sensors, one for each of the primary colors. The film is driven at a uniform rate past a linear light source, and an illuminated line of the film is imaged onto each CCD image sensor. The film motion provides the frame scan, and the linear cycling of the elements in the image sensor provides the line scan. A scanner of this type is disclosed in U.S. Pat. No. 4,205,337.

The lamps used in such systems normally produce a circularly symmetric light beam, and there is a problem in these systems in providing for an efficient conversion of the circular beam to a uniform line distribution of the light. In U.S. Pat. No. 4,797,711, for example, there is disclosed a scanner in which a transparent cylindrical rod is arranged to produce a line of light on an original. Light from a light source passes through color filters and is then directed onto one end of the cylindrical rod. Light reflected from the original is imaged onto a CCD image sensor. One of the main problems of the illumination system shown in this patent is that it does not provide a uniform line of diffuse light to an original such as film, and thus, artifacts on the original, e.g., scratches, will appear in an image produced from the scanned information.

It is also known in film scanners to use large, air filled integrating cylinders with a port in the cylinder wall into which light can be introduced. This light then multiply reflects within the cylinder to randomize the light distribution. This randomization produces uniform, diffuse light within the cylinder, which then exits through a long, narrow exit slit to produce a stripe of uniform, diffuse illumination when used as a linear light source. Alternatively, when used as a light collector, light can enter the narrow slit and exit the port.

U.S. Pat. No. 5,274,228 and U.S. Pat. No. 5,257,340 disclose excellent linear light source devices, which can be used in reverse as light collectors as described in those patents. By tailoring the dimensions of a reflective strip on the rod, it is possible to achieve a desired brightness profile along its length. However, the device disclosed in U.S. Pat. No. 5,274,228 uses a rod located inside a cavity within which light is reflected. Such a cavity increases the size of the device and the cost. U.S. Pat. No. 5,257,340 on the other hand, discloses a compact rod arrangement with a cladding coated over an internal core to provide internal reflection, followed by a reflective layer. However, coating the core with a cladding layer having the necessary properties followed by a coating with a reflective layer, is a relatively complex task. It will be appreciated that the foregoing can be considered a specific case of a more general situation where a coating, such as the reflective coating, is required on a dielectric medium through which light is to be conducted, where it is desired to have the reflective layer not substantially reduce total internal reflection within the core (hence, the reflective layer in U.S. Pat. No. 5,257,340 is separated from the core by the cladding).

It would be desirable, then, to provide a device which can provide a uniform light source for use in such applications as a scanner, or which can be used to collect light, which device can be readily tailored during construction for providing light of a given spatial profile or receiving light with a given spatial responsivity, and which is of relatively simple construction.

SUMMARY OF THE INVENTION

The present invention is based on the discovery that a device similar to that of U.S. Pat. No. 5,257,340 can be constructed but without the cladding layer described therein, provided the reflective layer meets certain characteristics. Furthermore, the invention broadly realizes that any light carrying medium can be coated with a layer meeting specified characteristics where it is desired that the coating has limited or no effect on total internal reflection ( "TIR") inside the light carrying medium.

The present invention therefore provides in a first aspect, an optical element comprising:

a light carrying medium through which light can propagate by total internal reflection;

a layer positioned adjacent the surface and being of a porous first material of sufficient porosity and with pores which are vacant or contain a second material having an index of refraction lower than that of the light carrying medium, such that the layer reduces TIR in the light carrying medium less than would be reduced using a non-porous layer of only the first material.

In a second aspect the present invention provides a light integrator comprising:

an elongated core having two ends and an elongated surface therebetween, down which light can propagate by TIR at the elongated surface;

a scattering region which disrupts TIR in the core; and a layer of reflective material positioned immediately over at least a portion of the totally internally reflective surface, which reflective material disrupts TIR less than the scattering region;

first and second light ports defined by regions of the core not covered by the reflective material positioned such that light can pass through the first port, propagate down the core by total internal reflection at the elongated surface, be scattered by the scattering region, reflected by the reflective material, and pass through the second port.

The present invention also provides a scanner using a light integrator of the present invention.

In the first aspect of the invention, any light carrying medium can be coated with a specified layer so that the layer will have limited or no effect on TIR inside the core. Additionally, in the second aspect, the element can provide a uniform light source or can be used to collect light, for use in such applications as a scanner, which element can be readily tailored during construction for providing light of a given spatial profile or receiving light with a given spatial responsivity, and which is of relatively simple construction particularly in not requiring any cladding layer.

BRIEF DESCRIPTION OF THE DRAWINGS

To facilitate understanding, identical reference numerals have been used, where possible, to designate identical elements that are common to the figures.

EMBODIMENTS OF THE INVENTION

Figure 1:
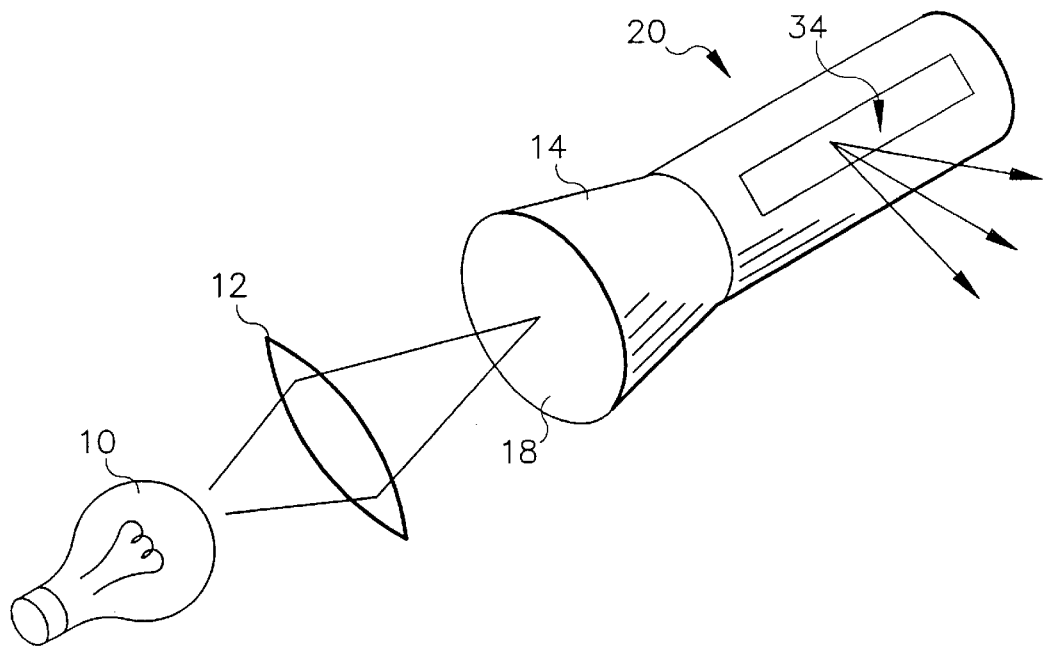
FIG. 1 is a perspective view of a light integrator of the present invention showing use with a cone and a light source to provide light.

With reference to a layer being adjacent the surface of the light transmitting medium, this means that while it need not be contacting that surface it will be within a few wavelengths of the surface so that it would affect total internal reflection in the light transmitting medium absent the required porosity. However, normally it will be contacting the surface. With reference to a layer of reflecting material being immediately over a portion of an internally reflecting surface, this means it will be in contact with such surface with no intervening layers.

In the optical element of the first aspect of the present invention, providing a layer as described, can provide a protective covering for the surface while not reducing internal reflection as much as other materials (such as a covering made of the first material only) and not requiring any intermediate cladding. The pores of the layer can contain various materials meeting the specified requirements, but may particularly be a gas such as air. The layer is also preferably of a reflective material to direct light which escapes from the light carrying medium back into it. The layer is preferably adhered to the light carrying medium (by using a suitable adhesive), however it may be made of a suitable material (such as a white powder) packed around the light carrying medium and held there by some other means (such as a further covering over the layer).

Insofar as the layer of the first embodiment is concerned, many types of different materials can be used. For example, most white powders would be suitable when moderately packed adjacent the surface, there being air pores between the powder grains. Examples of such powders particularly include a barium salt (preferably barium sulfate) powder, which can be adhered to the total internal reflecting surface by suitable means such as an adhesive carrier. Alternatively, a powder in a suitable adhesive carrier (for example, a paint) can be used. However, when the powder is adhered to the surface by means of an adhesive carrier, the properties may vary from the packed powder depending upon the carrier. Therefore, a powder in a carrier (such as a paint) should be checked again for the property of not reducing internal reflection in the light carrying medium too much even though the packed powder itself has been previously tested and found to have the necessary properties.

One easy way to test any particular reflective material is to coat it on the curved surface of a solid rod made of the material of the light carrying medium and observe through the end of the rod whether the material is visible. The more visible the material, the less suitable it would be as a layer of the required reflective material. If the reflective material does not disrupt the TIR then a total internal reflected image of the other end of the rod is observed. If quantitative measurements are desired, this can be done by measuring the percent transmission of diffuse light through the coated rod. These tests for reflective layers can also be used for non-reflective layers which are included in the first aspect of the present invention.

The light carrying medium of the first aspect of the present invention may be of any suitable shape for the application desired. However, it will preferably be an elongated core of the construction described in connection with the second embodiment.

In the second aspect of the present invention, the light scattering region can be obtained in a number of different ways. For example, a surface region of the core can be ground, or a particular paint applied to a surface region which will significantly disrupt TIR. Alternatively, one or more volume regions inside the core can be provided with scattering centers. The shape of the core can be varied, however a solid right circular cylinder is preferred (a circular cylinder having a uniform circular cross section, and a right circular cylinder having end faces which are at right angles to the curved surface extending between the ends).

In the second aspect of the present invention, it will be understood that by the reflective material disrupting TIR less than the scattering region, is referenced proportionally less disruption. That is, in the case where the scattering region is an area on a surface of the core, for a given area of the reflective material, it disrupts TIR less than an equivalent area of the scattering region at the same location would. In the case where the scattering region is a volume in the core, a given length of the reflective layer disrupts TIR less than the maximum disruption caused by an equal length of the scattering region anywhere in the core.

Insofar as the layer of the second embodiment is concerned, many types of different materials can be used. For example, most white powders would be suitable when moderately packed adjacent the surface. Also, a white powder can be adhered to the total internal reflecting surface by suitable means such as an adhesive carrier. One easy way to test any particular reflective material is to coat it on the curved surface of a solid rod made of the material of the light carrying medium and observe through the end of the rod whether the material is visible. The more visible the material, the less suitable it would be as a layer of the required reflective material. If the reflective material does not disrupt the TIR then a total internal reflected image of the other end of the rod is observed. If quantitative measurements are desired, this can be done by measuring the percent transmission of diffuse light through the rod. For relative measurements of the effect of the layer on TIR versus the effect of the scattering region on TIR, the same test can be used for each and the results compared.

Figure 2:
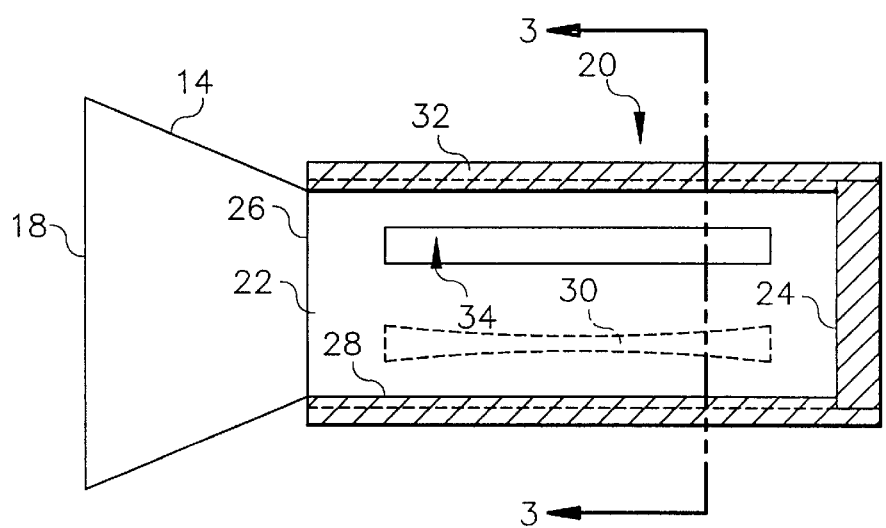
FIG. 2 is a plan view of the light integrator of FIG. 1 with cone attached.
Figure 3:
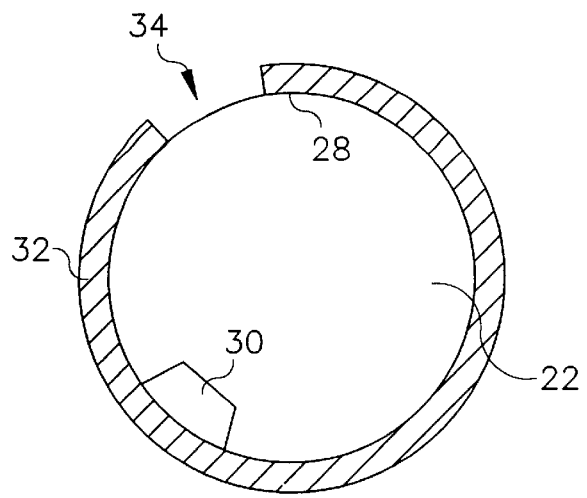
FIG. 3 is a vertical cross-section along line 3—3 of FIG. 2.
Figure 4A:
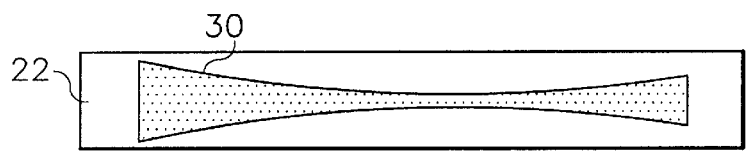
FIGS. 4A and 4B illustrate two different arrangements of a light scattering region on the surface of the core of a light integrator of the present invention.

Referring now to FIGS. 1 to 3 in particular, there is shown a light integrator 20 having a central core 22 in the shape of a solid right cylinder, with opposed end faces 24 and 26 separated by elongated curved surface 28. Core 22 is made from any suitable light transmitting material such that light can be propagated down it by TIR, reflecting off curved surface 28. Particular materials include a glass, plastic, and more preferably, quartz or fused silica. An elongated scattering region 30 is provided on curved surface 28. Scattering region 30 is preferably a finely ground area on surface 28 which is parallel to the axis of core 22, and disrupts TIR inside core 22. Scattering region 30 has a stretched hourglass shape as best seen in FIG. 4A. Region 30 is slightly narrower toward end face 26 than toward the opposite end face 24. A reflective paint layer 32 is positioned immediately over (that is, contacting the surface of core 22 without any intervening layer) end 24 and all of curved surface 28, except a narrow elongated slit 34 parallel to the axis of core 22. End face 26 and slit 34, which are both regions of the core not covered by layer 32, define first and second light ports through which light can pass into or out of light integrator 20. A hollow cone 14 with a specular reflective inner surface, is attached to end face 26, cone 14 having an end face 18 to receive light such that cone 14 directs it toward end face 26. Alternatively, cone 14 may be a solid optic cone (such as a glass cone), or a non-imaging optic such as described in *High Collection Nonimaging Optics*, by W. T. Welford and R. Winston, Academic Press, New York, 1989. It will be understood though, that cone 14 is not a part of the present light integrator invention and can even be omitted entirely in the use of the light integrator 20.

It is necessary in the present invention, that reflective layer 32 have the required property of causing little or no disruption of TIR inside core 22. Such materials may be found among reflective materials of the type described above. Suitable materials are very readily determined using the test described above. For illustration, the multitude of suitable powdered materials which have the necessary properties when simply packed around the core include barium sulfate powder, table salt, granulated sugar and even powdered coffee whitener. However, it is preferable that for simplicity the reflective layer be a painted layer 32 shown. The paint is a white powder in a carrier, and adheres to surface 28 when dry. It appears that the type and amount of carrier may affect whether the final dry layer has the necessary low effect on TIR, even if the packed powder material of the paint by itself may have. Again, in each case the proposed final layer should be tested for its effect on TIR in a manner such as described above since not all layers can be used. In particular, the following commercially available paints were found usuitable: three titanium compound containing paints, a zinc compound containing paint, a lead carbonate/zinc oxide paint, and a "KRYLON Flat While #1502" have not been found useful. Two particularly useful paints contain barium sulfate in a carrier, namely KODAK WHITE REFLECTANCE COATING available from Eastman Kodak Company, Rochester, N.Y., and SPECTRAFLECT available from Labsphere P.O. Box 70, North Sutton, N.H. 03260. Both of these paints contain barium sulfate in a carrier. In the first case the carrier includes alcohol/water/a small quantity of polyvinyl alcohol. Also, packed powders of the type already described could be used.

Figure 7A:
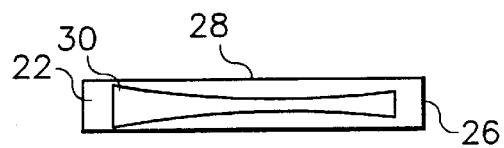
FIG. 7A–7C illustrates a sequence in manufacturing a light integrator of the present invention.
Figure 7B:
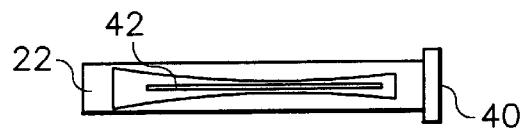
Figure 7C:
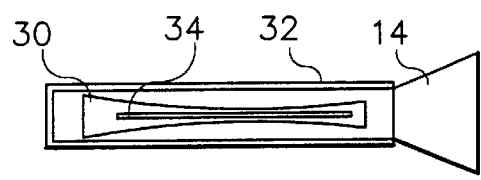

A particularly convenient method of manufacturing light integrator 20 is illustrated in FIGS. 7A to 7C. In particular, scattering region 30 is first finely ground on core 22. A mask 40 is then applied over end 26 and a mask 42 applied over surface 28 in the shape of the desired light port 34. The entire assembly can then be exposed to a paint which, when dry, will have the necessary reflective and low TIR affecting qualities. Masks 40 and 42 can then be removed and cone 14 positioned adjacent end face 26.

The operation of the light integrator of FIGS. 1–3, as a light source, is as follows. An electrically powered light source 10 is positioned to direct light through a lens 12 and into face 18 of cone 14. Cone 14 concentrates the light by internal reflection and directs it into end face 26 (now acting as an entry light port) of core 22. The light then propagates down core 22 by TIR, reflecting off curved surface 28. Reflecting layer 32, being of the type described, does not substantially interrupt this TIR. Eventually light strikes scattering region 30 which disrupts its total internal reflection and diffusely scatters it. The resulting non-TIR light will then pass through curved surface 28, but be diffusely reflected repeatedly back into core 22 by reflective layer 32 until eventually exiting through slit 34 (which now acts as an exit light port). Some fraction of the light propagating down the core by TIR reaches end face 24 before scattering, exits end face 24, reflects diffusely off reflective layer 32, and re-enters end face 24. As it re-enters, apparently because of the porosity of the reflective layer 32, the light refracts at end face 24 such that the diffusely reflected light becomes more collimated on re-entry, enhancing confinement in core 22 by TIR. This TIR light scatters, is reflected, and exits slit 34 in the same manner as above. Since the light will have been multiply diffusely reflected inside core 22 by layer 32 before exiting through slit 34, a highly diffuse light will emerge from slit 34 whose light intensity distribution is largely determined by the shape of scattering region 30, and the position of region 30 relative to slit 34.

Figure 4B:
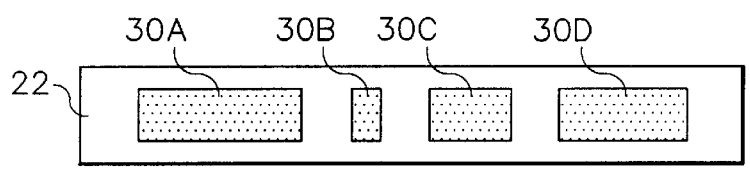

With the shape of scattering region 30 shown in FIG. 2 and 7A, light exiting slit 34 will be of fairly uniform intensity along the length and width of slit 34. However, different intensity profiles are readily achieved by altering the shape of scattering region 30. Also, instead of, or in addition to, controlling the shape of the scattering region, the scattering region can be duty cycle modulated by varying the frequency of occurrence and length of scattering portions 30a–30d which are along surface 28 of core 22, as shown in FIG. 4B.

Figure 5:
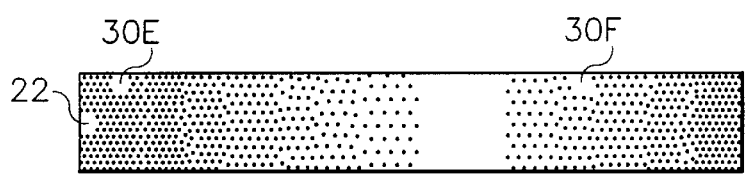
FIG. 5 illustrates a volume scattering region within a core of a light integrator of the present invention.

Rather than using a scattering area in the form of region 30, the scattering region can consist of a volume within the core 22 containing scattering centers such as illustrated in FIG. 5. The scattering centers can, for example, be voids or small particles. The density of scattering centers may be varied along the length of core 22, as shown in FIG. 5, to control the output profile.

Figure 6A:
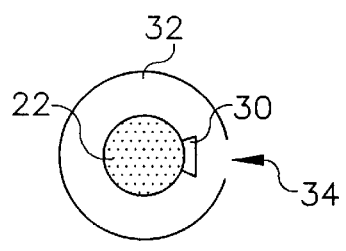
FIGS. 6A–6C are vertical cross-sections through integrators such as that shown in FIG. 3 but with proportions and spacings exaggerated for clarity and showing different relative locations of a light port and scattering regions on the surface of a core.
Figure 6B:
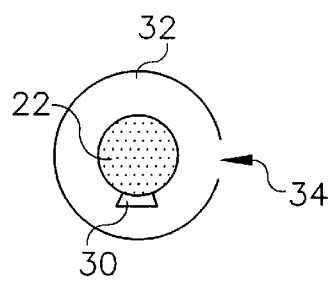
Figure 6C:
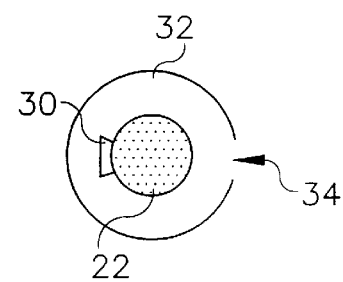

A variable which can be used to control the appearance of artifacts (particularly for a scanner application) as well as brightness, is the relative position or distance apart radially of slit 34 and scattering region 30 as shown in FIGS. 6A–6C. FIGS. 3 and 6B illustrate them spaced about 90° apart (note that in all of FIGS. 6A–6C reflective layer 32 is shown spaced apart from core 22 for clarity) and of approximately the same length and positions along core 22. Light which passes directly from scattering region 30 to slit 34 will tend to produce a peak in the angular profile of the output light exiting slit 34. Where an application requires very diffuse light, scattering region 30 and slit 34 should be spaced less than 90° apart, such as a 0° orientation shown in FIG. 6A. The 180° separation tends to increase the brightness.

It will be appreciated that light integrator 20 can be used in reverse from the manner described above as a light source, to provide a light collector.

Figure 8:
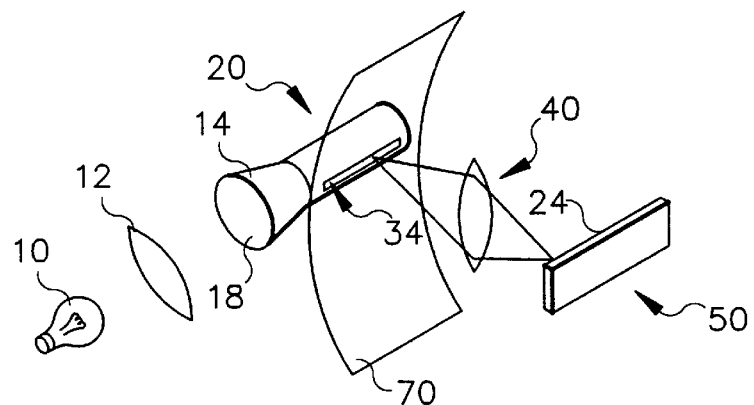
FIG. 8 illustrates a scanner of the present invention using a light integrator of the present invention as a light source.

FIG. 8 illustrates a film scanner of the present invention using the light integrator arrangement shown in FIGS. 1–3 and 4A as a light source. An electric lamp light source 10 will be focused by a lens 12 onto face 18 as shown in FIG. 1 and described above. The diffuse light will leave through slit 34 and illuminate a film 70 held in place by a media holder (not shown) to receive light from slit 34. This illuminated stripe of film 70 is then imaged through a lens system 40 onto a linear sensor 50, such as a CCD array, which converts the scanned image into a sequence of signals corresponding to the image. By moving the film 70 vertically past the exit slit 34, a full image frame on the film 70 can be scanned.

Figure 9:
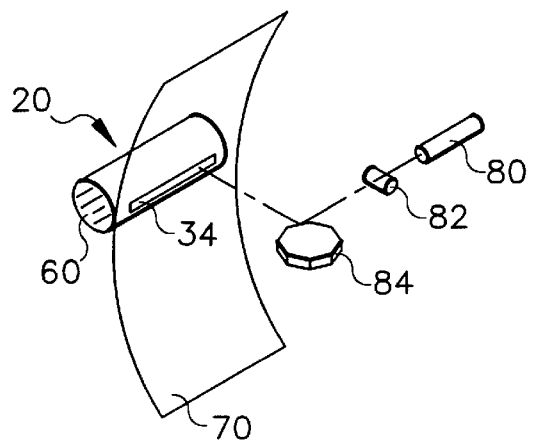
FIG. 9 illustrates another scanner of the present invention using a light integrator of the present invention using a light integrator of the present invention as a light collector.

FIG. 9 illustrates the use of light integrator 20 as a linear light collector used to collect a laser light beam passing through and modulated by the optical density of the image on a film 70 (again, held in place by a suitable media holder). Such film scanners may, for example, be used to scan radiographic images recorded by X-ray or the like on transparencies in order to provide a digital record for storage, transmission to remote locations and to conduct image enhancement and analysis. In FIG. 9 a laser light source 80 is imaged by a lens system 82 onto the facets of a rotating mirror 84 which deflects the beam in a scanning line onto the film 70. The scanned beam transverses the film 70, and the light transmitted through the film 70 enters the slit 34 of light integrator 20. Light integrator 20 functions inversely to its use as a linear light source described above. Light collected is directed to end face 26 which is covered by a light detector 60 which converts the signal received into a corresponding electrical output. In this manner each frame of film 70 can be converted to a sequence of signals corresponding to the image on it.

It will also be appreciated that the scanner of the present invention can have its media holder and other components positioned to scan a reflective medium (such as a photographic print) in a known manner.

The invention has been described with reference to a preferred embodiment. However, it will be appreciated that variations and modifications can be effected by a person of ordinary skill in the art without departing from the scope of the invention.

PARTS LIST

| | |
|---|---|
| 10 | Light Source |
| 12 | Lens |
| 14 | Cone |
| 18 | Face |
| 20 | light Integrator |
| 22 | Core |
| 24 | End Face |
| 26 | End Face |
| 28 | Curved Surface |
| 30 | Region |
| 32 | Layer |
| 34 | Slit |
| 40 | Mask |
| 42 | Mask |
| 50 | Linear Sensor |
| 60 | Light Detector |
| 70 | Film |
| 80 | Light Source |
| 82 | Lens System |
| 84 | Rotating Mirror |

I claim:

1. An optical element comprising:
    a light carrying medium through which light can propagate by total internal reflection, the light carrying medium having at least one surface;
    a layer positioned adjacent the surface and being of a porous first material of sufficient porosity and with pores which are vacant or contain a second material having an index of refraction lower than that of the light carrying medium, such that the layer reduces total internal reflection in the light carrying medium less than would be reduced using a non-porous layer of the same dimensions of only the first material.

2. An optical element according to claim 1 wherein the pores contain a gas.

3. An optical element according to claim 1 wherein the layer is reflective.

4. An optical element according to claim 1 wherein the light carrying medium is a glass, plastic, quartz or fused silica.

5. An optical element according to claim 1 which is a light pipe.

6. An optical element according to claim 1 wherein the layer is adhered to the light carrying medium.

7. An optical element according to claim 3 wherein the reflective layer comprises a white particulate material.

8. An optical element according to claim 7 wherein the white particulate material is barium sulfate.

9. A light integrator comprising:
    an elongated core having two ends and an elongated surface therebetween, down which light can propagate by total internal reflection at the elongated surface;
    a scattering region which disrupts total internal reflection in the core; and
    a layer of reflective material positioned immediately over at least a portion of the totally internally reflective surface, which reflective material disrupts total internal reflection less than the scattering region;
    first and second light ports defined by regions of the core not covered by the reflective material, positioned such that light can pass through the first port, propagate down the core by total internal reflection at the elongated surface, be scattered by the scattering region, reflected by the reflective material, and pass through the second port.

10. A light integrator according to claim 9 wherein the reflective layer is a layer having sufficient porosity and with pores which are vacant or contain a second material having an index of refraction lower than that of the core, such that the layer reduces total internal reflection in the light core less than it would be reduced using a non-porous layer of the same dimensions of only the first material.

11. A light integrator according to claim 10 wherein the scattering region is at least one area on the surface of the core.

12. A light integrator according to claim 10 wherein the scattering region is at least one volume within the core.

13. A light integrator according to claim 10 wherein the core is a solid cylinder.

14. A light integrator according to claim 10 wherein the core is a solid right circular cylinder.

15. A light integrator according to claim 14 wherein the scattering region is an elongated region along the curved surface of the cylinder.

16. A light integrator according to claim 15 wherein the first light port is at an end face of the cylinder.

17. A light integrator according to claim 16 wherein the second light port is an elongated port parallel to the cylinder axis.

18. A light integrator according to claim 9 wherein the layer of reflective material comprises a white particulate material.

19. A light integrator according to claim 18 wherein the white particulate material is barium sulfate.

20. A light integrator according to claim 14 wherein:

the scattering region is an elongated region along the curved surface of the cylinder;

the first light port is at an end face of the cylinder and the second light port is an elongated port on the curved surface of the cylinder and parallel to the cylinder axis;

the reflective layer is adhered to at least a portion of the totally internally reflecting surface and comprises barium sulfate particles;

the core is quartz or fused silica.

21. A light integrator according to claim 20 wherein the reflective layer is also adhered to the end face of the cylinder opposite the first port.

22. A light integrator according to claim 9 additionally comprising an electrically powered light source positioned to direct light into a light port.

23. A light integrator according to claim 17 additionally comprising an electrically powered light source positioned to direct light to a light port.

24. A method of collecting light using a light integrator of claim 6, comprising directing light into the second port which light exists the first port.

25. A scanner, comprising:

a) a light source;

b) a light integrator comprising:

an elongated core having two ends and an elongated surface therebetween, down which light can propagate by total internal reflection at the elongated surface;

a scattering region which disrupts total internal reflection in the core; and a layer of reflective material positioned immediately over at least a portion of the totally internally reflective surface, which reflective material disrupts total internal reflection less than the scattering region;

first and second light ports defined by regions of the core not covered by the reflective material, the first port being positioned to receive light from the light source and direct it into the core such that it propagates down the core by internal reflection at the elongated surface, is scattered by the scattering region, and reflected by the reflective material to escape through the second port;

c) a media holder to position an image bearing medium to be scanned so that the medium receives light from the second port of the integrator; and d) a detector positioned to receive light from the medium being scanned and generate a sequence of signals corresponding to the image.

26. A scanner according to claim 25 wherein the reflective layer of the light integrator is a layer having sufficient porosity and with pores which are vacant or contain a second material having an index of refraction lower than that of the core, such that the layer reduces total internal reflection in the light core less than would be reduced using a non-porous layer of the same dimensions of only the first material.

27. A scanner according to claim 26 wherein the core is a solid cylinder, the first port is located on an end surface of the cylinder, the scattering region is an elongated region along the curved surface of the cylinder, and the second light port is an elongated port parallel to the cylinder axis.

28. A scanner, comprising:

a) a light source;

b) a media holder to position an image bearing medium to be scanned so that the medium receives light from the light source; and c) a light integrator to collect light from the medium in the media holder, comprising:

an elongated core having two ends and an elongated surface therebetween, down which light can propagate by total internal reflection at the elongated surface;

a scattering region which disrupts total internal reflection in the core; and a layer of reflective material positioned immediately over at least a portion of the totally internally reflective surface, which reflective material disrupts total internal reflection less than the scattering region;

first and second light ports defined by regions of the core not covered by the reflective material, the second port being positioned to receive light from a medium in the media holder, which light is reflected by the reflective material, is scattered by the scattering region, propagates down the core by total internal reflection to exit out the first port;

d) a detector positioned to receive light from the first port.

29. A scanner according to claim 28 wherein the reflective layer of the light integrator is a layer having sufficient porosity and with pores which are vacant or contain a second material having an index of refraction lower than that of the core, such that the layer reduces total internal reflection in the light core less than would be reduced using a non-porous layer of the same dimensions of only the first material.

30. A scanner according to claim 28 wherein the core is a solid cylinder, the first light port is an elongated port parallel to the cylinder axis, the second port is located on an end surface of the cylinder, and the scattering region is an elongated region along the curved surface of the cylinder.

* * * * *